Figure 1A:
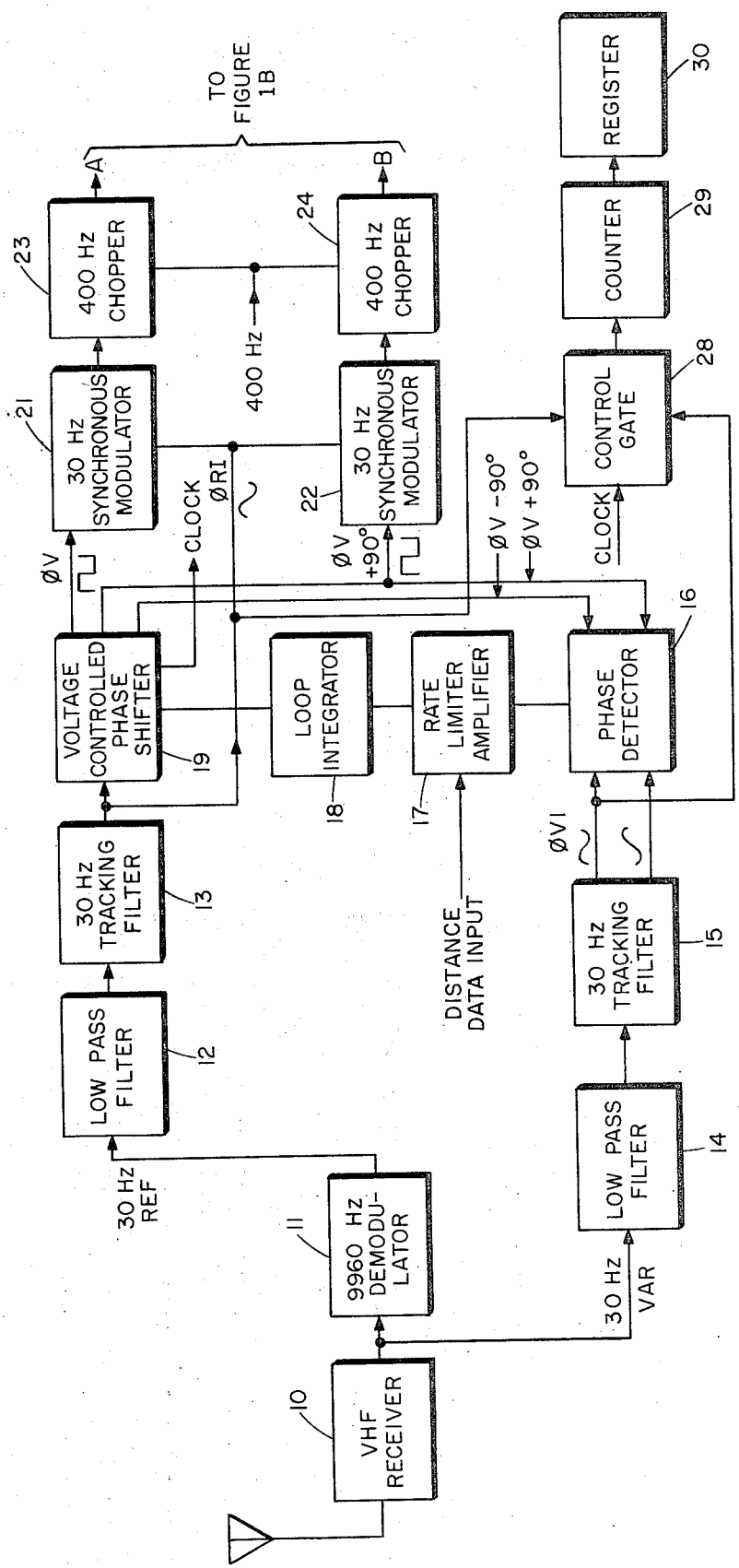

United States Patent [19]

Sawicki

[11] 3,792,473

[45] Feb. 12, 1974

[54] VOR RECEIVER WITH ADAPTIVE FILTERS AND PHASE SHIFTER FOR IMPROVED ACCURACY

[75] Inventor: Joseph J. Sawicki, Lighthouse Point, Fla.

[73] Assignee: The Bendix Corporation, Southfield, Mich.

[22] Filed: Nov. 21, 1972

[21] Appl. No.: 308,393

[52] U.S. Cl. ............................ 343/106 R, 324/83 R
[51] Int. Cl. ............................................. G01s 1/44
[58] Field of Search ................. 343/106 R; 324/83 R

[56] References Cited
UNITED STATES PATENTS

| 3,725,933 | 4/1973 | Perkins et al. | 343/106 R |
| 3,523,295 | 8/1970 | Perkins | 343/106 R |
| 3,386,096 | 5/1968 | Lundgreen et al. | 343/106 R |
| 3,534,399 | 10/1970 | Hirsch | 343/106 R |

*Primary Examiner*—Maynard R. Wilbur
*Assistant Examiner*—S. C. Buczinski

[57] ABSTRACT

An improved VOR receiver which includes adaptive band pass filters for the 30 Hz reference and variable signals and an electronic phase shifter for shifting the variable and reference signals into phase coincidence, the amount of phase shift thus introduced being a measure of VOR bearing angle. The phase shifter is controlled by a feedback loop having a limiter which controls the rate of change of phase shift as a function of distance from the VOR station thereby reducing effects of scolloping in the beam of the VOR transmitter upon bearing indications.

15 Claims, 5 Drawing Figures

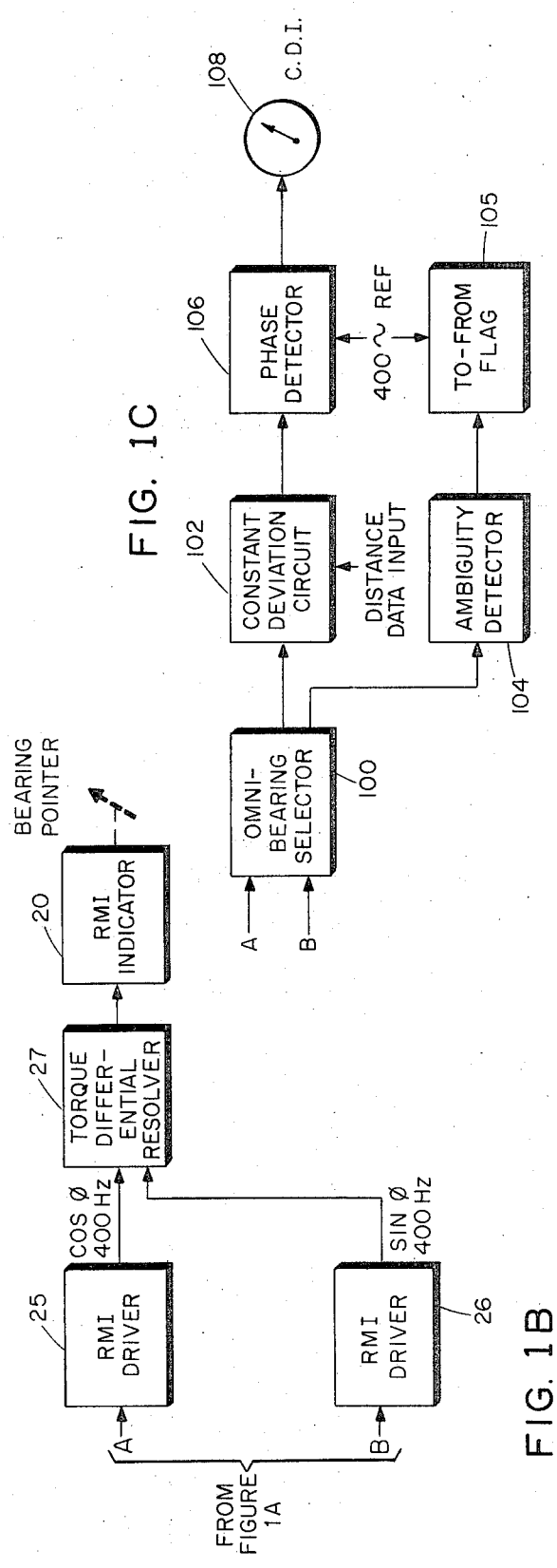
FIG. 1C
FIG. 1B
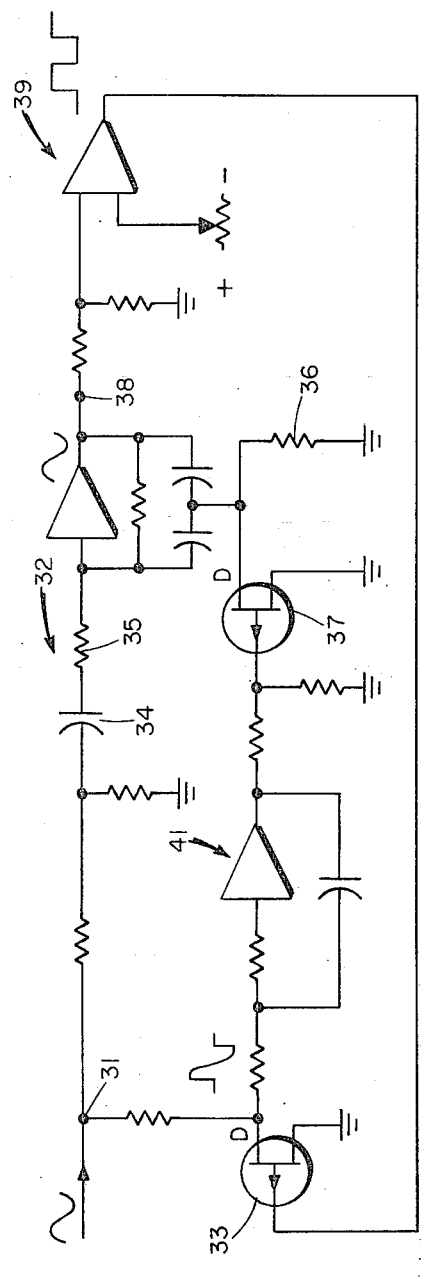
FIG. 2

VOR RECEIVER WITH ADAPTIVE FILTERS AND PHASE SHIFTER FOR IMPROVED ACCURACY

The present invention relates to radio navigation receivers particularly of the type for processing signals from a VOR transmitter.

The VOR (Very High Frequency Omnidirectional Range) system is established throughout the world as a standard en route navigational aid for aircraft. It is well known as comprising a transmitter broadcasting from a rotating directional antenna a carrier wave amplitude modulated by a subcarrier. The subcarrier is frequency modulated to provide a reference signal which is compared in phase with the signal resulting from amplitude modulation of the carrier by the rotating antenna. The phase difference resulting is directly related to the bearing angle of the receiver to or from the transmitter.

Conventional VOR receivers include a superheterodyne receiver with an AM detector at its output which produces a 9960 Hz/30 Hz FM subcarrier with 30 Hz AM modulation thereon resulting from rotation of the transmitter antenna. The 30 Hz AM signal, known as the variable phase signal, is separated from the subcarrier by a low pass filter. The 9960 Hz is limited and demodulated in a discriminator to obtain the 30 Hz FM signal known as the reference phase signal. Thereafter, either the reference of the variable phase signal is applied to a phase shifter, commonly an electromechanical resolver, and the phase shifted signal is phase detected relative to the other signal. For automatic VOR operation the phase detector controls a servo motor which adjusts the phase shifter until a null output is obtained from the phase detector. The bearing angle is then indicated by the amount of rotation of the phase shift required to produce a null. In manual operation the phase shifter is rotated to a position corresponding to a selected course to or from the transmitter and the aircraft is flown so as to maintain a null phase detector output.

The VOR system is subject to errors, some of which are introduced by obstructions in the transmitter-receiver path or other vagaries of propagation, and many of which are introduced by the receiver itself. The errors originating in the receiver may result from differential phase shifts between the circuits carrying the reference and the variable signals, non-linearities in the phase shifter, servo or phase detector or phase distortions in the circuits used to separate the reference and variable signals from the composite signal.

Efforts have been made to reduce errors originating within the VOR receiver. These include careful design and compensation of tuned filters and precision manufacture of electromechanical phase shifters but these methods cannot compensate for errors which may result from a change in frequency of the 30 Hz VOR signals. Further, it has been proposed to eliminate the electromechanical phase shifter and to present digital bearings indications. Simply stated, the latter proposal involves a cross-over detector each for the reference and variable signals which control a gate, a clock oscillator and a counter. The gate is opened at the beginning of a cycle of reference signal and closed at the beginning of a cycle of variable signals. During the open period of the gate, the clock signal is counted so that at the end of the gate-open period the accumulated count is directly related to VOR bearing. Such a system, through phase shifter errors may be eliminated, is nevertheless subject to errors because there is no provision for slaving the clock frequency to the 30 Hz VOR frequency nor is there provision for maintaining a precise phase relationship between the clock signal and the VOR signals.

It is an object of the present invention to provide a VOR receiver in which errors originating within the receiver are minimized.

It is a further object to provide a VOR receiver which operates automatically to provide bearing information without the use of electromechanical phase shifters.

It is another object to provide a VOR receiver which produces bearing information in both analog and digital form.

Another object is to produce a VOR receiver which responds adaptively as a function of the distance of the receiver from the transmitting station to reduce the undesirable effects on bearing information produced by scallops and noise in the received signal.

Still another object is to produce a VOR receiver which provides an output signal linearly related to distance off course, that is, a constant deviation output signal, which signal is not seriously degraded at greater distances from the VOR station.

Briefly, the invention comprises a VOR receiver distinguished from prior receivers in the use of novel voltage controlled filter and phase shifter circuits allowing feedback control of these circuits to eliminate phase errors and distortions usually present in fixed tuned circuits. The filters include frequency selective networks having elements with impedances variable by control voltages. The network input, either the 30 Hz variable phase or reference phase signal, is simultaneously applied to a quadrature demodulator. The network output is converted to a square wave serving as a second input to the demodulator. The demodulator output is integrated in a high gain integrator the output of which constitutes the feedback voltage controlling the voltage variable impedance. The filter output, taken at the output of the selective network, is an extremely clear signal capable of following frequency variations which may occur in the fundamental of the input signal and eliminating therefrom harmonic distortions and the like.

The phase shifter includes a voltage controlled oscillator (VCO) operating at a substantially higher frequency than the 30 Hz reference and variable signals. The frequency of the VCO is divided down and applied to two feedback loops which act jointly to control the VCO. One of the feedback loops operates through a phase detector and an integrator to synchronize the VCO output precisely with the 30 Hz variable signal. The 30 Hz reference signal synchronizes a 15 Hz sawtooth wave and the VCO output, divided down to 15 Hz, samples that wave to provide input to the other feedback loop thereby insuring that the 30 Hz output of the divider is locked in frequency and phase to the VOR reference and variable signals. An additional feature of the phase shifter is a distance controlled rate limiter in the feedback loop which includes the integrator. Limitation of error input to the integrator as a function of range prevents scallops in the VOR signal from causing large erroneous fluctuations in bearing indications when the receiver is some distance from the transmitter. The divider of the phase shifter also produces two outputs precisely at 90° leading and lagging the variable phase VOR signal. These are combined in synchronous modulators with the reference phase VOR signal to produce analog voltages controlling an instrument for indicating bearing to the aircraft pilot. The phase shifter VCO output is fed through a gate controlled by the VOR reference and variable signals to a counter which produces a binary coded word representing the bearing for use by course computers.

In the drawings:

FIG. 1A with FIG. 1B is a functional block diagram of a VOR receiver incorporating the invention with a bearing indicator of the RMI type; FIG. 1C shows an alternative indicator of the course deviation type.

Figure 3:
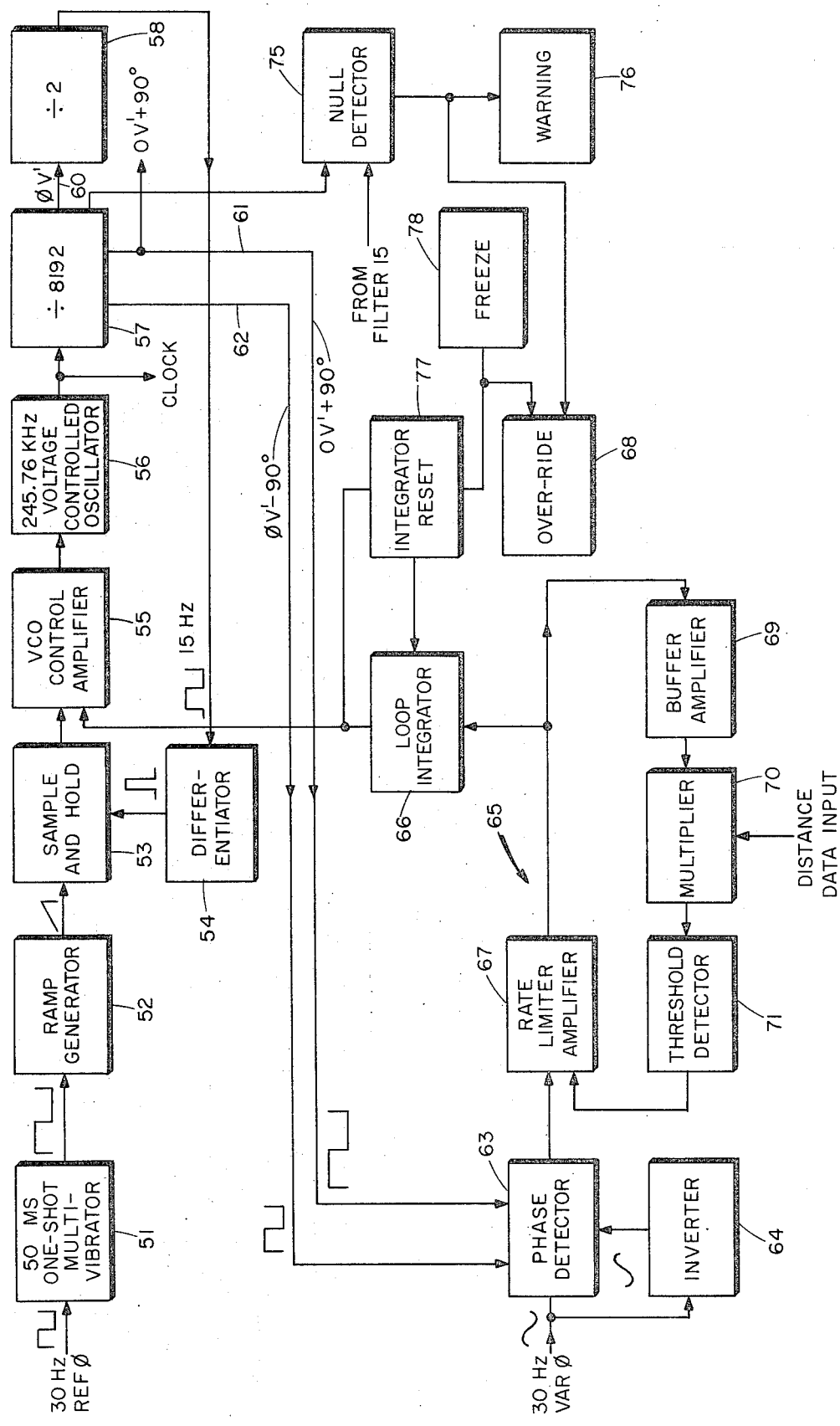

FIG. 2 is a schematic diagram of an adaptive filter for tracking the VOR 30 Hz reference or variable signals; and FIG. 3 is a functional block diagram of the voltage controlled phase shifter of the invention including distance controlled rate limiting means.

Referring to FIG. 1A a VHF receiver 10 tuned to a VOR station produces a conventional composite signal at its output including the variable phase signal as 30 Hz AM modulation and the reference phase signal as 30 Hz FM modulation of a 9960 Hz subcarrier. The latter signal is recovered from the subcarrier by an FM demodulator 11 and applied to a filter 12 having a low pass characteristic thence to a 30 Hz tracking filter which has a narrow bandpass characteristic and which is self-tuning to accommodate frequency variations in the VOR signal and to compensate for detuning effects of temperature variation and the like. The composite signal from receiver 10 is passed through a low pass filter 14 which eliminates the subcarrier therein to produce the 30 Hz variable phase signal. The variable phase signal is filtered in a 30 Hz tracking filter 15 similar to filter 13 except that an inverter is included to provide a second output in phase opposition to the variable phase signal. Both outputs of filter 15 are applied to a phase detector 16 which compares the phase thereof with feedback signals leading and lagging the variable phase signal by 90°. A departure in phase of the feedback signals from this 90° relationship produces an error signal which is limited in amplitude as a function of distance in a rate limiter amplifier 17, then integrated in a loop integrator 18 to control a voltage controlled phase shifter 19. The phase shifter 19, as will be more fully described hereinafter, shifts the phase of reference signal from filter 13 to provide the quadrature feedback signals for phase detector 16. The phase shifter 19 likewise produces a square wave output in phase with the variable phase signal at the output of filter 15. Phase shifter 19 includes a voltage controlled oscillator (VCO), the frequency of which is maintained at a precise harmonic of the 30 Hz reference signal and which is precisely phased with respect to the 30 Hz variable signal. The VCO output is divided down in frequency to produce the phaseshifted variable signal and is used directly as a clock signal for digital computation of bearings.

The in-phase square wave from phase shifter 19 and the +90° feedback signal therefrom, which is also in square wave form, are each multiplied by the reference phase signal output from filter 13 in 30 Hz synchronous modulators 21, 22. These respectively produce d-c outputs having magnitudes proportional to cosine $\theta$ and sine $\theta$, and $\theta$ is the VOR bearing angle. The cosine $\theta$, sine $\theta$ outputs of modulators 21, 22 are each modulated at a 400 Hz rate in choppers 23, 24. The outputs of these are 400 Hz waves each having amplitudes proportional to cosine $\theta$ and sine $\theta$. Referring to FIG. 1B, after amplification in drivers 25, 26 the modulated 400 Hz waves are conducted to the radio magnetic indicator (RMI) 20, remotely located on the aircraft instrument panel. The RMI is a standard instrument which combines absolute bearing data from the VOR with magnetic heading from the aircraft compass in a torque differential resolver 27 to produce an indication of the relative bearing from the aircraft to the VOR station.

The RMI indicator 20 automatically indicates the magnetic bearing of the VOR station relative to the aircraft. In another mode of VOR operation, termed manual, a course directed along a particular VOR radial is selected and the aircraft is flown toward or away from the station, with course errors being shown on a course deviation indicator. FIG. 1C illustrates manual VOR operation. The A and B outputs of choppers 23 and 24 are applied to the stator windings of an omnibearing selector 100, which is an electromechanical resolver with the rotor thereof graduated in degrees corresponding to the selected course. The rotor of selector 100 carries two quadrature windings, the output from one of which is applied to a constant deviation circuit 102 with the output from the other going to an ambiguity detector 104. Ambiguity detector 104 functions conventionally to operate a TO-FROM flag 105. The constant deviation circuit is a multiplier providing the product of the course error output from selector 100 and an analog voltage proportional to the distance of the aircraft from the VOR station. The output from constant deviation circuit 102 is phase detected 106 and applied as d-c to a course deviation indicator 108 of standard aircraft type. Preferably the gain through constant deviation circuit 102 to indicator 108 is adjusted so that a 10° course error multiplied by an analog voltage of 57 miles just produces full scale deflection of the indicator, the offset from course then being 10 miles. At distances closer to the VOR station than 57 miles the angular error required to produce full scale indicator deflection is greater than 10° while at distances greater than 57 miles the angular error for full scale deflection is proportionately smaller than 10°. Thus, the output of phase detector 106 is linearly related to distance off course, a particularly desirable feature when the system is used to control an autopilot. The adaptive filtering provided by the action of rate limiter 17 and loop integrator 18 prevents scallops and noise from having effects further magnified by the increase in gain which occurs in the constant deviation circuit at distances greater than 57 miles.

Again referring to FIG. 1A, reference signal from filter 13 and variable signal from filter 15 are applied respectively to open and to close a control gate 28. The VCO contained in phase shifter 19 supplies clock signals which are conducted through gate 28 to a counter 29 for a time corresponding to the phase difference between the 30 Hz reference and variable signals. The count accumulated by counter 29, which is the digital value of the VOR bearing, is transferred to a register 30 during each period of the 30 Hz VOR signal where it is encoded for transmission to a course computer or to a digitally operated indicator.

A simplified schematic of tracking filter 13 appears in FIG. 2 to which reference is now made. The 30 Hz rference phase signal is applied to junction 31 whence it proceeds to the input of a voltage controlled selective filter 32 and to the drain of an FET 33 which serves as a quadrature chopper demodulator. Filter 32 is an operational amplifier with an input network comprising capacitor 34 and resistor 35 and a T-connected feedback network including resistor 36 and FET 37. The combination produces a filter with a band pass characteristic which is controlled by the parallel impedance of resistor 36 and FET 37, the impedance being variable as a function of the voltage applied to the FET gate. The output of filter 32 appearing at junction 38 is a sine wave shifted in phase by 90° from the input at junction 31. The sine wave at junction 38 is converted to an in-phase square wave in crossover detector 39, the output of which is fed back to the gate of FET 33. When the square wave from detector 39 is in phase quadrature with the reference phase signal at junction 31 a voltage corresponding to that portion of the reference phase signal existing between 90° and 270° of its cycle is developed at the drain of FET 33. The average value of this wave is obtained in an operational amplifier 41 with capacitive feedback and applied as controlled voltage to the gate of FET 37. This control voltage is zero so long as a quadrature phase relationship pertains between the square wave from detector 39 and the sine wave at junction 31. If the reference phase signal at junction 31 should shift in phase or frequency a control voltage is developed at the output of amplifier 31 of proper sense and magnitude to adjust the parallel impedance 36, 37 and hence the bandpass characteristic of filter 32 to cause the latter to center itself on the frequency of the wave at junction 31. As previously stated, tracking filter 15 is identical to tracking filter 13, hence FIG. 2 will serve to describe either of these filters.

The output of filter 13 is shifted into phase coincidence with output from filter 15 by voltage controlled phase shifter 19 which includes a clock oscillator synchronized with output from filter 15 by means of the phase lock loop comprising phase detector 16, rate limiter 17 and loop integrator 18. The voltage controlled phase shifter is shown in greater detail in FIG. 3, to which reference is now made. The square wave output of crossover detector 39 is inverted and applied as a trigger voltage to a 50 ms. one-shot multivibrator 51. Multivibrator 51 is triggered by the positive leading edge of the waves from an inverter (not shown) and since its period exceeds the 33.3 ms. period of the square wave, multivibrator 51 is triggered at a 15 Hz rate. A ramp generator 52 is connected to multivibrator 51 to be reset each time the multivibrator fires. The output of ramp generator 52 has a sawtooth waveform with a period equal to twice the period of the reference phase signal from crossover detector 39. The sawtooth wave from ramp generator 52 is applied to a sample and hold circuit 53 which produces a constant voltage output equal to the voltage attained by the linearly rising sawtooth at the time a sample pulse appears from a differentiator 54. Output from the sample and hold circuit 53 is amplified 55 and used as one part of the control voltage for a 245.76k Hz voltage controlled oscillator 56. Output from VCO 56 is divided down in frequency by a factor of 8,192 in a multistage frequency divider 57 to produce a 30 Hz signal which is further divided by a factor of 2 in divider 58 to produce a 15 Hz signal.

Divider 57 includes digital means for combining the 30 Hz output with a 60 Hz signal available in the divider at a stage preceding the stage producing 30 Hz output so as to produce two additional 30 Hz outputs on line 61 and 62 which respectively lead and lag the 30 Hz output on line 60 by 90°. The quadrature 30 Hz signals on lines 61 and 62, identified as $\phi_v' + 90°$ and $\phi_v' - 90°$, respectively, are applied to the phase detector 63 which also receives an input 30 Hz variable phase signal from filter 15 together with inverted reference phase signal from an inverter 64. The output of phase detector 63 is a d-c signal proportional to the phase error between $\phi'_v$ signal on line 60 and the 30 Hz reference phase signal from filter 15. This error signal is passed through a limiter 65, the limits of which are variable as a function of distance, as will later be more fully explained, and then integrated in a loop integrator 66 to provide a second portion of the output of amplifier 55 used for controlling the frequency of VCO 56.

VCO 56 and its control amplifier 55 are so designed that with zero output from loop integrator 66 and with a precise 30 Hz input to multivibrator 51 the VCO will stabilize at a frequency of 245.76k Hz with a control voltage corresponding to the midpoint of the sawtooth wave from ramp generator 52. Since the frequency of the sawtooth wave is one-half the frequency of the input wave to multivibrator 51, each cycle of sawtooth represents 720° of the 30 Hz reference phase input. With the stable condition of the VCO occurring at the midpoint of the sawtooth, the entire sawtooth corresponds to phase with the 30 Hz reference ranging from −360° to +460°.

When a phase difference exists between the 30 Hz reference input to multivibrator 51 and the 30 Hz variable input to phase detector 63, as it would at any other bearing from the aircraft to the VOR station except 0°, an error signal appears at the output of phase detector 63 which will then be integrated and appear as a change in the control voltage of VCO 56. This causes a transitory change in the frequency of the VCO which continues until the $\phi'_v$ output on line 60 is in phase with the 30 Hz variable signal. Simultaneously, the 15 Hz input to differentiator 54 is changing its time relationship with the sawtooth from ramp generator 52 so that output from the sample and hold circuit 53 tends to balance output from loop integrator 66. In the final stable condition, $\phi'_v$ signal on line 60 is precisely in phase with the 30 Hz variable phase signal input to phase detector 63 and the sampling pulse from differentiator 54 corresponds to a point on the sawtooth from generator 52 which equals the phase difference between the 30 Hz variable reference signals. As previously stated, input to loop integrator 66 passes through a limiter 65 having limits which vary as a function of the distance of the receiver from the VOR transmitter. The greater the distance, the lower will be the limits and consequently the smaller is the rate of change of output from integrator 66. At greater distance the phase change in the 30 Hz variable signal caused by motion of the aircraft carrying the receiver is relatively small. For example, the bearing between station and an aircraft located 100 miles from the station and traveling at 600 mph cannot change at a rate greater than about 0.1° per second. At 10 miles distance the rate of change in bearing due to aircraft motion is 10 times as great. Changes in the phase of the 30 Hz variable signal occur at rates greater than these but such changes are due to imperfections in the transmitted VOR signal which desirably should be smoothed or averaged out in the bearing information developed by the receiver. Limiter 65 includes an amplifier 67 to which input is applied from phase detector 63 and from a feedback circuit comprising override circuit 68, buffer amplifier 69, multiplier 70, and threshold detector 71. The function of override circuit 68 will later be described. Buffer amplifier 69 provides circuit isolation and multiplier 70 produces an output which is proportional to the product of output from amplifier 67 and an analog voltage which is proportional to the distance of the receiver from the VOR station. The analog distance voltage is obtained from distance measuring equipment (DME), commonly included as part of an aircraft navigation system. Threshold detector 71 conducts to apply a voltage to amplifier 67 opposing the voltage from phase detector 63, thereby reducing the output of amplifier 67, whenever the signal level of input exceeds the threshold setting. The threshold may be exceeded whenever the output from phase detector 63 is large and distance is small or whenever output from phase detector 63 is relatively small and distance is large. The voltage conducted by detector 71 to oppose output from detector 63 in amplifier 67 is, in fact, proportional to the output of multiplier 70, but conduction does not occur until the threshold level of detector 71 is exceeded. The result of this arrangement is that output from phase detector 63 can change output of integrator 66 only at a rate which diminishes with distance of the receiver from the VOR station.

It is desirable to disable limiter 65 under certain conditions, for example, when the system is first acquiring bearing information and a phase difference greater than about 10° exists between the $\phi'_v$ signal and the 30 Hz variable signal. For this purpose, a null detector 75 is provided which receives square wave variable signal from the crossover detector of filter 15 and a square wave from divider 57 which is 180° out-of-phase with the input from filter 15 when the $\phi'_v$ output of the divider is precisely in-phase with the 30 Hz variable signal. Whenever the phase error in $\phi'_v$ becomes greater than about 10°, sufficient output from null detector 75 is developed to actuate the override circuit 68. Override 68 operates as a switch to open the input line to amplifier 69 and consequently remove the output of detector 71 opposing error signal output from detector 63. Integrator 66 can then rapidly charge to the value required to bring the $\phi'_v$ signal into phase coincidence with the 30 Hz variable signal. Output from null detector 75 also actuates a warning circuit 76 which indicates that the bearing data then being displayed is erroneous.

The phase range of phase shifter 19 is limited to ±360°. To prevent the phase shifter from operating at these extremes, integrator 66 is caused to be reset whenever th phase difference between the 30 Hz reference and variable signals equals ±270°. The phase shifter then introduces an opposite 90° phase shift. Integrator reset circuit 77 is a threshold detector which is triggered whenever the level of output voltage from integrator 66 equals the levels on the sawtooth wave from generator 52 corresponding to −270° and +270°. When triggered, reset 77 rapidly discharges the output voltage of integrator 66 to zero and also operates override circuit 68 to remove the limits on error signal input to the integrator. The phase error from detector 63 will then be of a sense causing integrator 66 to charge to a polarity opposite that at which reset occurred and to a value corresponding to 90°. For example, the amplitude of the sawtooth wave might suitably be −10 to +10 volts. Levels of ±7.5 volts then respectively correspond to ±270°. When the output of integrator 66 reaches either of these levels, say, +7.5 volts, reset 77 is triggered to discharge the integrator output to zero. Output from phase detector 63 will then cause integrator 66 to stabilize at −2.5 volts output, corresponding to −90°.

During the integrator reset it is desirable to freeze the CDI or RMI indicator to prevent meaningless excursions thereof. Freeze circuit 78 is a multivibrator triggered by integrator reset circuit 77 to produce a switching pulse of three seconds duration to temporarily disconnect inputs to modulators 21 and 22 (FIG. 1) and cause the outputs thereof to remain constant. At the conclusion of the freeze pulse, integrator 18 will be reset to ±90° and the CDI or RMI will again receive valid VOR bearing without perceptible interruption.

The invention claimed is:

1. In a receiver for a VOR navigation system wherein bearing indications are provided by comparing the phase of a reference signal and a variable signal received from a VOR transmitting station, the inprovement comprising,
   a voltage controlled phase shifter to which said reference signal and said variable signal is applied, said phase shifter including a clock oscillator having an output frequency substantially higher than the frequency of said reference and variable signals, said clock oscillator output frequency being variable as a function of a control voltage applied to said oscillator;
   a frequency divider for said clock oscillator providing a first output signal substantially equal in frequency to the frequency of said variable signal, said divider also producing a second output in quadrature with said first output,
   a phase detector receiving said variable signal and said first and second outputs of said frequency divider for providing an error signal;
   means for integrating said error signal and means for applying said integrated error signal to said clock oscillator to control the frequency thereof.

2. The improvement of claim 1 wherein said voltage controlled phase shift includes,
   a ramp generator providing an output of sawtooth waveform synchronized with said reference signal; and,
   a sampling circuit, said sampling circuit being controlled by said divider to sample and hold a voltage from said ramp generator output corresponding to the difference in phase between said VOR reference and variable signals.

3. The improvement of claim 2 with additionally,
   a limiter interposed between said phase detector and said integrator for limiting the magnitude of said error signal.

4. An improved VOR receiver as claimed in claim 3 operating in conjunction with distance measuring equipment for determining the distance of said VOR receiver from the VOR transmitting station and with additionally,
   means for controlling as a function of the distance of said VOR receiver from the VOR transmitter the values to which the magnitude of said error signal is limited.

5. A receiver for a VOR navigation system in which bearing information is obtained by comparing phase of a variable signal with a reference signal, both signals being broadcast by a VOR transmitter, the phase between said signals being dependent upon the position of said receiver with respect to said transmitter, comprising
- a radio receiver including detector means for separating reference and variable signals transmitted by a VOR station;
- a first adaptive filter for said reference signal;
- a second adaptive filter for said variable signal;
- each of said adaptive filters including an amplifier, a frequency selective network for said amplifier, said network including a voltage variable impedance, and means controlling said impedance including a detector for comparing quadrature phase relationship of the input signal to each said filter with the output signal therefrom;
- means for determining the phase difference between output signals of said first and second adaptive filters; and,
- means for indicating said phase difference.

6. A receiver as claimed in claim 5 wherein each said frequency selective network comprises an input branch through which signal is applied to said amplifier and an output branch through which output of said amplifier is fed back to the input thereof, said variable impedance forming a part of said output branch, and wherein said means controlling said impedance comprises means receiving output from said amplifier and producing a square wave therefrom, a detector receiving a signal simultaneously applied to said input branch of said network, said signal being either said reference signal or said variable signal, said detector being switched into and out of conduction by said square wave, and means providing the average value of signal conducted by said detector, said average value serving to control said variable impedance.

7. A receiver as claimed in claim 5 wherein said means for determining the phase difference includes a voltage controlled viable frequency clock oscillator having an output frequency substantially higher than the frequency of said VOR reference and variable signals, means for dividing the frequency of said clock oscillator substantially to the frequency of said VOR reference and variable signals; and phase lock means receiving the output of said dividing means and one of said VOR signals, said phase lock means providing control voltage for said clock oscillator to cause output from said dividing means to maintain a fixed phase relationship with said one VOR signal received by said phase lock means.

8. A receiver as claimed in claim 7 wherein output of said dividing means constitutes two signals one of which is in phase with said one VOR signal received by said phase lock means and the other of which is in quadrature therewith and wherein said indicating means includes means for modulating the other of said VOR signals by said two signals from said dividing means to produce analog voltages of the sine and cosine functions of the bearing angle.

9. A receiver as claimed in claim 7 with additionally, second dividing means for further dividing the frequency of said clock oscillator to a sub-harmonic of the frequency of said VOR reference and variable signals,
- means receiving the output of said second dividing means and said VOR signal other than said one received by said phase lock means and providing a voltage related to said phase difference between said VOR reference and variable signals, said voltage exerting control on said clock oscillator in addition to said control voltage of said phase lock means.

10. A receiver as claimed in claim 8 with additionally phase shift means controlled manually to which said analog voltages are applied for shifting the phase of said analog voltages a preselected amount corresponding to a preselected bearing angle; and,
- a phase detector receiving said phase shifted analog voltages from said manually controlled phase shifter and providing an output related to the difference between said preselected bearing angle and the VOR bearing angle.

11. A receiver as claimed in claim 10 with additionally;
- means providing an analog voltage related to the distance of said receiver from said VOR transistor; and
- multiplying means interposed between the output of said manually controlled phase shifter and said phase detector, said multiplying means supplying as input to said phase detector a voltage which is related to the product of said sine-cosine analog voltage and said distance analog voltage.

12. A receiver as claimed in claim 9 with additionally,
- a control gate receiving said VOR reference and variable signals and output from said clock oscillator, said gate being rendered conductive to transmit said clock oscillator output by one of said VOR signals and rendered non-conductive by the other of said VOR signals to block transmission of said clock oscillator output; and,
- a counter receiving clock oscillator output transmitted by said control gate, said conductor accumulating a count of oscillations of said transmitted clock oscillator output to provide a digital representation of the VOR bearing angle.

13. A receiver for a VOR navigation system for vehicles wherein bearing indications are obtained in the receiver by comparing the phase of a variable signal with a reference signal both signals being broadcast as a composite signal by a VOR transmitter, comprising:
- means for separating a received composite VOR signal into a variable signal and a reference signal;
- an adaptive filter each for said variable signal and said reference signal.
- a voltage controlled phase shifter to which one of said filtered reference or variable signals is applied for shifting the phase of said one signal into coincidence with the other of said reference or variable signals;
- a phase detector for comparing the phase of said other signal with output from said voltage controlled phase shifter to provide an error signal output;
- an adjustable limiter to which said error signal output is applied for limiting the magnitude of said error signal to an adjusted maximum value;

means controlling said adjustment of said limiter as a function of the distance of said receiver from the VOR transmitter whereby said maximum value of said error signal is decreased at increased distances;

means for integrating said limited error signal to provide a control voltage for said voltage controlled phase shifter;

means for modulating output of said voltage controlled phase shifter by said one signal; and, indicating means responsive to output from said modulating means for indicating VOR bearing data.

14. A VOR receiver as claimed in claim 13 wherein said indicating means includes a manually controlled phase shifter to which output from said modulating means is applied for shifting the phase thereof an amount corresponding to a selected VOR course;

multiplying means receiving output from said manually controlled phase shifter and data representative of the distance of said receiver from the VOR transmitter to provide an output proportional to the product of said distance and said manually controlled phase shifter output; and, a null detector receiving said product from said multiplying means for indicating deviation of the vehicle carrying said receiver from said selected course.

15. A VOR receiver as claimed in claim 13 wherein said voltage controlled phase shifter comprises a ramp generator synchronized by said one signal to produce a sawtooth output waveform having a period which is an integral multiple of the period of said one signal;

a voltage controlled oscillator operating at a frequency substantially higher than that of said variable and reference signals;

means dividing the frequency of the output of said voltage controlled oscillator to the frequency of the output of said ramp generator;

means synchronized by output from said dividing means for sampling output from said ramp generator; and, means applying output from said sampling means as a portion of the control voltage for said voltage controlled oscillator, the remainder of said oscillator control voltage being comprised of said integrator output.

* * * * *